United States Patent [19]
Racenis

[11] 3,918,457
[45] Nov. 11, 1975

[54] WATER LEVEL CONTROL FOR WASHING MACHINES

[75] Inventor: Karlis V. Racenis, Ripon, Wis.

[73] Assignee: McGraw-Edison Company, Ripon, Wis.

[22] Filed: May 3, 1973

[21] Appl. No.: 356,742

[52] U.S. Cl............. 137/387; 137/406; 116/118 R; 68/208
[51] Int. Cl.²......................................... F16K 21/18
[58] Field of Search..... 116/118 R, 118 A; 137/387, 137/403, 406; 68/208, 12 R

[56] References Cited
UNITED STATES PATENTS

| | | | |
|---|---|---|---|
| 2,662,384 | 12/1953 | Morrison et al. | 68/208 |
| 2,885,879 | 5/1959 | Bloom | 137/403 |

Primary Examiner—S. Clement Swisher
Assistant Examiner—Marcus S. Rasco
Attorney, Agent, or Firm—Wolfe, Hubbard, Leydig, Voit & Osann, Ltd.

[57] ABSTRACT

A pressure-independent water level control for washing machines utilizes an air pressure dome connected to a small tank remote from the washing machine tub. A slipstream of the water fed to the tub is conducted to the tank, where it creates a pressure in the dome. The dome pressure actuates a pressure-responsive switch to signal a pressure level corresponding to a predetermined water level in the washing tub, and can thereby terminate the main flow of water to the tub.

6 Claims, 6 Drawing Figures

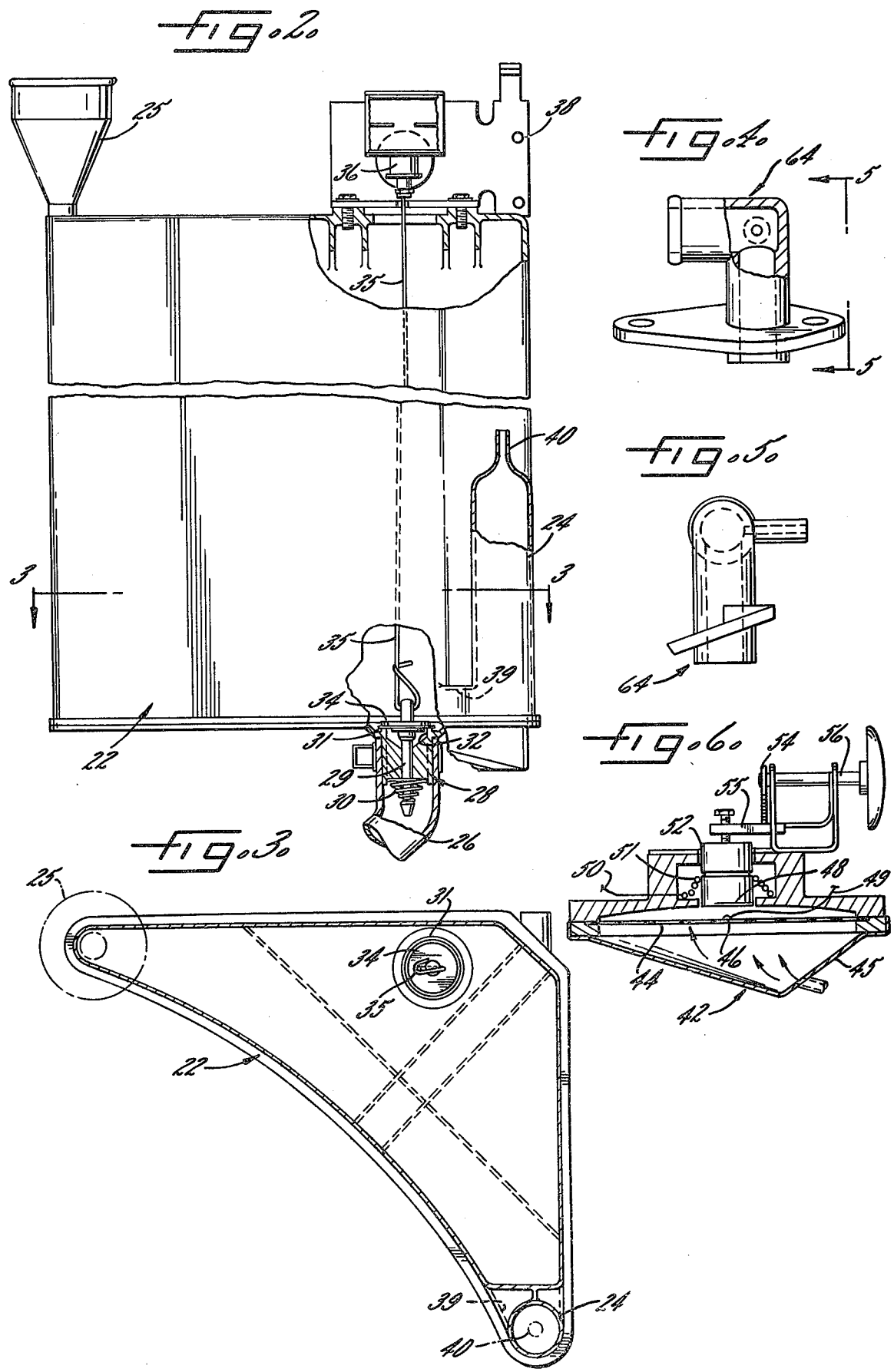

WATER LEVEL CONTROL FOR WASHING MACHINES

BACKGROUND OF THE INVENTION

This invention relates to water level controls for washing machines, and more particularly concerns the provision of a water level control which is both remote from the washing machine tub and independent of the pressure of water being admitted into the machine.

Virtually all types of automatic washing machines require control of the water level during one or more portions of the wash cycle. In washing machines having imperforate, or solid, washing tubs, control of the level is particularly difficult; floats and pressure operated controllers cannot be placed within the tub, and time-governed valves are incapable of accommodating differing water pressures.

Accordingly, an object of the invention is to provide a level control for washing machines, particularly of the solid tub type, which is remote from the washing tub, insensitive to water line pressure, and exceptionally durable in use.

Another object is to provide a level control which never comes in contact with any medium other than water. Thus, an associated object is to provide such control in a location remote from the possibly corrosive effects of detergents, bleach, and the like.

Still another object is to provide a level control independent of water line pressure which is capable of adjusting the washing tub level to a plurality of different pre-selected levels.

An overall object is to provide a low cost, durable, and rugged level control assembly having a service life at least as long as any other functional component of a washing machine.

SUMMARY OF THE INVENTION

Briefly, and in accordance with the invention, a pressure-independent water level control assembly is provided which comprises a vertically elongated tank receiving a slipstream of the water being admitted to a washing tub. An air dome, advantageously integral with the tank itself, has a lower opening communicating with a lower portion of the tank so as to develop a pressure in the dome corresponding to the height of water in the tank. To sense this pressure, a pressure-responsive switch communicates with the air dome to thereby signal a pressure level corresponding to a predetermined level in the tank and hence in the washing tub.

A drain valve is provided for draining water from the tank and, correspondingly, releasing pressure from the dome. This valve advantageously is a spring loaded, vertically moveable, plunger type valve, actuated by a solenoid connected outside and above the tank. The solenoid thus opens the drain valve.

Accordingly, as the main stream of water is admitted into the washing tub, the slipstream simultaneously fills the elongated tank. This in turn increases the pressure in the air dome, actuating the pressure-responsive switch when the pressure reaches a predetermined level. This pressure level corresponds to a predetermined height level of water in the main washing tub, and serves to signal the termination of water input to the tub. When, at a later stage of the washing cycle, water is to drain from the washing tub, a signal to the solenoid-operated drain valve releases water from the tank and re-sets the level control system for additional control functions at further stages of the washing cycle.

BRIEF DESCRIPTION OF THE DRAWINGS

Other objects and advantages of the invention will become apparent from the following detailed description and upon reference to the drawings, in which:

FIG. 1 is an elevation, in partial section, of a washing machine embodying the present invention;

FIG. 3 is a horizontal section of the pressure tank assembly taken along the line 3—3 of FIG. 2;

FIG. 4 is an elevation of a proportional fill tee, in partial section;

FIG. 5 is a side elevation of the tee of FIG. 4; and

FIG. 6 is a sectional view of a pressure-responsive switch, shown schematically for illustrative purposes.

Figure 2:
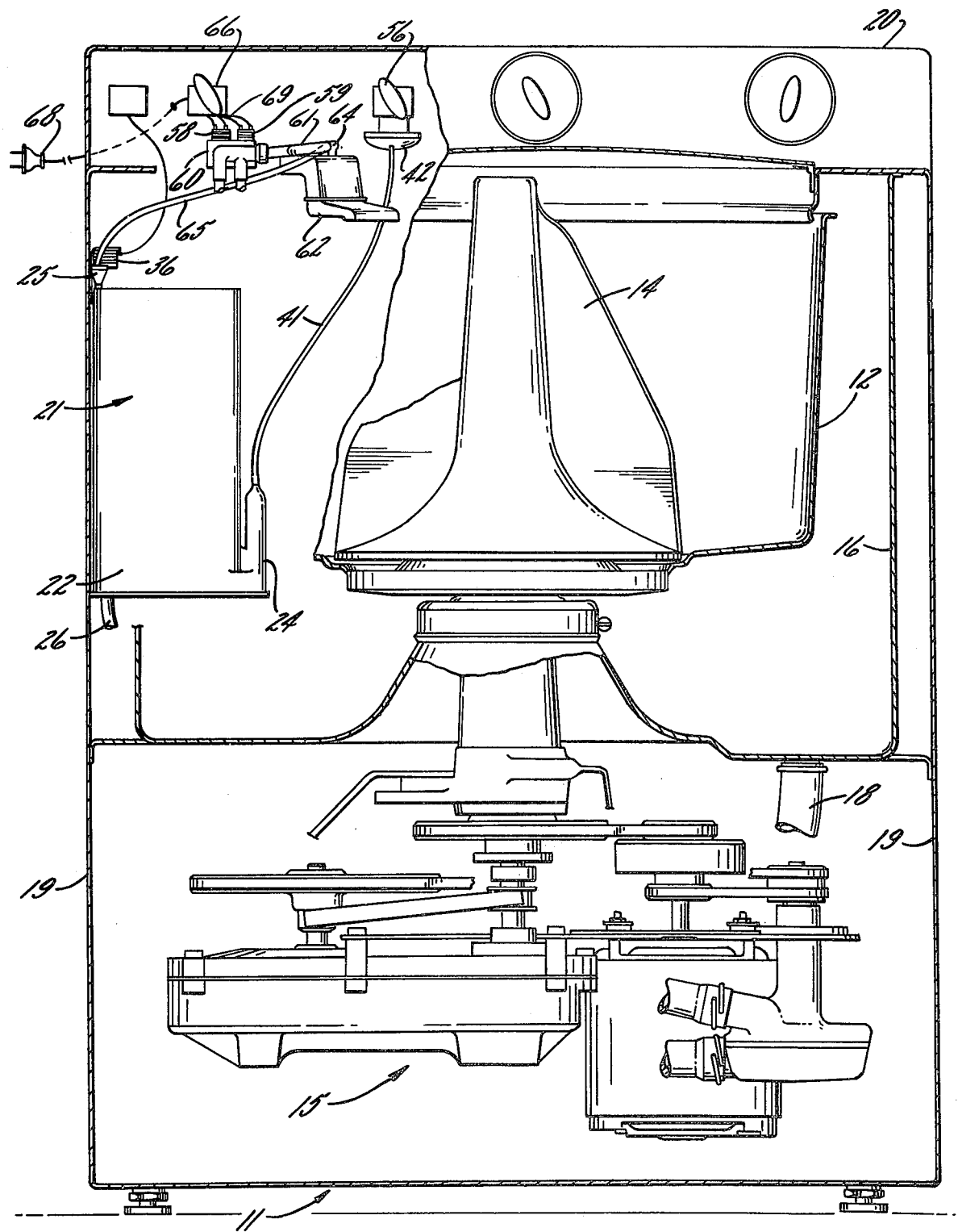
FIG. 2 is a side elevation, in partial section, of a pressure tank assembly as shown in FIG. 1.

While the present invention will be described in connection with a preferred embodiment, it will be understood that the intention is not to be limited to the particular embodiment shown, but on the contrary, it is the intention to cover the various alternative and equivalent arrangements included within the spirit and scope of the appended claims.

Referring to the drawings, FIG. 1 illustrates a front elevation, in partial section, of a washing machine embodying the present invention. In general, the machine, shown as 11, has a generally bowl-shaped spin tub 12 for receiving a load of laundry and for containing the load during a complete washing cycle. The spin tub 12 has rather steep flared side walls and a generally flat bottom portion, and is adapted to rotate about a vertical axis.

A multi-bladed agitator 14 is positioned coaxial with the spin tub 12, and is adapted for oscillating rotary movement.

The spin tub 12 and the agitator 14 are each rotated by a motor and gear work mechanism shown schematically as element 15. Numerous motor and gear devices are known, and are described, for example, in U.S. Pat. No. 3,498,085 and U.S. Pat. No. 3,557,580, as they form no part of the present invention. In over-view, however, and in a normal cycle of operation, clothes are placed in the spin or washing tub 12 and wash water and detergent are added. The agitator 14 is then operated for a selected period of time to wash the clothes. Thereafter, the spin tub 12 is rotated at high speed to extract the wash water by centrifugal action to discharge the water over the upper edges of the spin tub and hence remove excess water from the clothes. After rotation of the spin tub 12 is terminated, rinse water is added and, if desired, the agitator 14 is again started. The agitator is stopped once more, and spinning of the tub 12 follows for extracting the rinse water. When the extraction is completed the cycle is terminated and the clothes are removed. With imperforate spin tub washing machines, the spin tub 12 is located within a drain tub 16 to collect water centrifuged from the spin tub. This drain tub 16 discharges to the sewer via a drain conduit 18.

As shown in FIG. 1, both the spin tub 12, the motor and drive mechanism 15, and the drain tub 16 are located with an external cabinet 19, generally of rectangular shape. A hollow backsplash or panel 20 contains various controls and switches for operation of the machine. For the most part, these controls and switches are conventional and need not be described further here.

In keeping with the invention, a vertically elongated pressure tank assembly, shown generally at 21, is positioned remote from the spin tub 12 and regulates the maximum water level in the spin tub. The assembly 21 comprises an elongated tank 22 (shown in more detail in FIGS. 2 and 3) which is approximately triangular in horizontal section so as to fit in one corner of the cabinet 19. The assembly 21 is advantageously located outside the drain tub 16, although for simplicity of construction it may be desirable to locate the tank 22 within the tub 16.

The tank 22, as shown in FIGS. 2 and 3, is a long vessel, preferably made of an organic plastic material such as polyethylene or polypropylene, advantageously with an integral air dome 24 connected to the main tank 22 near a lower portion of the tank. Thus, as water enters the tank 22 and rises, it first seals off the air dome 24 and then increases the pressure within the dome.

As also shown in FIGS. 2 and 3, the tank 22 has a water inlet funnel 25 near one of the acute-angled corners, and a drain conduit 26 at the tank bottom.

To release water from the tank 22, a drain valve assembly 28 is provided. This valve 28 includes a plunger 29 that is vertically movable within the valve, and which is spring loaded by a spring 30 to maintain a water-tight seat between a resilient gasket 31, or neoprene or the like, and the valve seat member 32. The plunger itself is advantageously of plastic or other non-corrosive material, and includes a disc 34 which is just wider than the seat member 32 in order to insure firm closing.

To actuate the valve 28, a wire 35 is connected at one end to the plunger 29 and, at the remote end outside and above the tank 22, to a solenoid 36. The solenoid assembly is mounted on a bracket 38 which also serves for mounting the tank 22 onto the washing machine cabinet 19 (FIG. 1).

Integral with the tank 22 is the air dome 24, a substantially smaller tank having a lower pressure-communicating conduit 39 connecting with the interior of the tank 22, and an upper conduit 40 connecting via a flexible tube 41 (FIG. 1) to a pressure switch 42. The pressure switch 42, best shown in the sectioned schematic of FIG. 6, includes a flexible membrane 44 within a pressure chamber 45. The membrane 44 carries an electrical contact 46 which establishes contact with a corresponding electrical contact 48 on a positioning plug 52 at a predetermined air pressure. Appropriate electrical connections 49, 50 are made to the respective contacts 46, 48, the latter via a spring 51 which simultaneously maintains electrical continuity and urges a contact 48-positioning plug 52 into an upward position. The position of the plug 52 is governed by the position of a rotary cam 54 which regulates the position of a resilient stop 55. Rotation of the shaft 56 locates the height of the stop 55, and correspondingly the position of the contact member 48.

With an adjustable pressure-responsive switch such as that shown in FIG. 6, any predetermined pressure in the air dome 24 (FIGS. 1, 2) can be selected. As a consequence, front-panel adjustment of the control shaft 56 (FIG. 1) permits the operator to pre-select any desired pressure at which the switch is energized, and consequently any desired water level in the spin tub 12.

Returning again to FIG. 1, it is appropriate to trace the water flow into the machine 11. From separate hot and cold water conduits 58, 59, water is admitted to a solenoid-controlled mixing valve 60; various thermostatic controlled solenoid systems are well known and need not be described. From the mixing valve 60, a blended flow of water is conducted via a conduit 61 to a water inlet assembly 62 where, after optional mixing with bleach, the stream of water flows into the spin tub 12.

Just before reaching the water inlet assembly 62, the conduit 61 flows into a proportional fill tee 64, best shown in FIGS. 4, 5. This tee is a three-way connection, with an inlet conduit of about 0.38 inches diameter splitting into two mutually-right-angled discharge conduit, the larger of about 0.31 inches diameter, flowing to the water inlet assembly 62 (FIG. 1), while the smaller, of about 0.07 inches diameter, flowing via a flexible conduit 65 (FIG. 1) to the funnel (FIGS. 1, 2) leading into the pressure tank 22.

To operate a level control system according to the invention, the spin tub 12 is filled with a load of dirty clothes or the like and the washing machine operation commenced, usually by starting an electrical timer-switch assembly 66 receiving power from a line 68. This actuates a signal via electrical conduit 69 to open the solenoid-controlled mixing valve 60 and admit water into the spin tub via the conduit 61.

As water flows through the conduit 61 into the water inlet assembly 62 and ultimately the spin tub 12, a portion of the water is withdrawn via the smaller hole of the proportional fill tee 64 (FIG. 4). The hole sizes are so selected that approximately one-twentieth of the water entering via the conduit 61 is taken as a slipstream through the conduit 65 to the pressure tank assembly 21. It is important to emphasize that this proportion is maintained irrespective of water line pressure and of line pressure fluctuations.

As water fills the main spin tub 12, it also begins filling the vertically elongated tank 22. When the conduit 39 (FIG. 2) between the tank 22 and the air dome 24 becomes immersed, additional water admitted into the tank 22 increases the pressure in the dome 24. This in turn is communicated via the conduit 41 to the pressure switch 42 (FIGS. 1 and 5) and, when it reaches a predetermined level, overrides the "open" signal to the mixing valve 60 solenoids and terminates further water flow into the spin tub. Operation of the agitator 14, followed by rapid rotation of the spin tub 12, are then the succeeding steps in the washing cycle or sequence.

At this stage, a signal to the solenoid 36 (FIGS. 1, 2) energizes the solenoid, applying tension on the wire 35 and opening the drain valve assembly 28. Water is released from the tank 22, and pressure is simultaneously released from the air dome 24. As a result, the level control system is re-activated and is ready for use. Until the pressure in the dome 24 again builds to the preselected pressure level (corresponding to a preselected water level in the spin tub 12), uninterrupted control of the mixing valve 60 solenoids 58, 59 by the cycle timer 66 is possible. Only if the level in the spin tub 12 rises (e.g., upon failure of the motor and gear mechanism 15) does the level control operation take over again.

Thus it is apparent that there has been provided, according to the invention a water pressure-insensitive level control assembly which provides remote, positive, and essentially foolproof water level control for washing machines. The inherent advantages of solid tub washing machines are thus realized without encountering any of the disadvantages or complexities of preexisting level controllers.

I claim:

1. In a pressure-independent water level control assembly for a washing machine, the improvement whereby said assembly is remote from the washing machine tub so that said assembly never comes in contact with any medium other than water, comprising:

means for splitting a stream of water into a main stream for admission to said tub, and a slip stream, a vertically elongated tank receiving said slip stream of water when water is being admitted to a washing tub in said machine, said slip stream of water being the only medium admitted to said tank, an air dome having a lower opening communicating with a lower portion of said tank to thereby develop a pressure in said dome corresponding to the height of water in said tank, a pressure-responsive switch communicating with an upper portion of said air dome to signal a pressure level corresponding to a predetermined level in said washing tub, a drain valve for draining water from said elongated tank, and means for opening said drain valve at a predetermined stage in a washing cycle to drain water from said tank and to release pressure from said air dome.

2. The level control assembly of claim 1 wherein said vertically elongated tank is generally triangular in horizontal section to conform to the shape of said washing tub.

3. The level control assembly of claim 1 wherein said air dome and said vertically elongated tank are portions of a unitary plastic structure.

4. The level control assembly of claim 1 wherein said drain valve is a spring loaded, vertically moveable, plunger type valve.

5. The pressure control assembly of claim 1 wherein said means for opening said drain valve comprise a solenoid connected to said drain valve and positioned outside and above said elongated tank.

6. The level control assembly of claim 1 wherein said pressure-response is adjustable to thereby predetermine a plurality of different levels in said washing tub.

* * * * *